US010068389B1

(12) United States Patent
Strege et al.

(10) Patent No.: US 10,068,389 B1
(45) Date of Patent: *Sep. 4, 2018

(54) METHOD AND APPARATUS FOR EVALUATING AN AXLE CONDITION ON A MOVING VEHICLE

(71) Applicant: Hunter Engineering Company, St. Louis, MO (US)

(72) Inventors: Timothy A. Strege, Sunset Hills, MO (US); Michael T. Stieff, Wentzville, MO (US); Daniel R. Dorrance, Ballwin, MO (US)

(73) Assignee: Hunter Engineering Company, St. Louis, MO (US)

(*) Notice: Subject to any disclaimer, the term of this patent is extended or adjusted under 35 U.S.C. 154(b) by 13 days.

This patent is subject to a terminal disclaimer.

(21) Appl. No.: 14/884,250

(22) Filed: Oct. 15, 2015

Related U.S. Application Data

(60) Provisional application No. 62/068,329, filed on Oct. 24, 2014.

(51) Int. Cl.
*G07C 5/00* (2006.01)
*G07C 5/08* (2006.01)

(52) U.S. Cl.
CPC .......... *G07C 5/008* (2013.01); *G07C 5/0808* (2013.01); *G07C 5/0816* (2013.01)

(58) Field of Classification Search
CPC ..... G07C 5/008; G07C 5/0816; G07C 5/0808
See application file for complete search history.

(56) References Cited

U.S. PATENT DOCUMENTS

| | | | |
|---|---|---|---|
| 4,123,023 | A | 10/1978 | Nelson |
| 4,153,131 | A | 5/1979 | Sakata et al. |
| 4,341,021 | A | 7/1982 | Beissbarth |
| 4,745,469 | A | 5/1988 | Waldecker et al. |
| 4,863,266 | A | 9/1989 | Masuko et al. |
| 4,899,218 | A | 2/1990 | Waldecker et al. |
| 5,220,399 | A | 6/1993 | Christian et al. |
| 5,268,731 | A | 12/1993 | Fuchiwaki et al. |

(Continued)

FOREIGN PATENT DOCUMENTS

| JP | 63094103 | 4/1988 |
|---|---|---|
| JP | 11120480 | 4/1999 |

(Continued)

OTHER PUBLICATIONS

Sensing Solutions—Automotive Industry, pp. 1-12, 2005, Keyence Corporation, Product Lit. No. SSO5S-AUTO-KA-L-E 0085-1, Japan.

(Continued)

*Primary Examiner* — Alan D Hutchinson
(74) *Attorney, Agent, or Firm* — Sandberg Phoenix & von Gontard P.C.

(57) ABSTRACT

A vehicle measurement station utilizing one or more displacement sensors disposed on each opposite side of an inspection region of a vehicle inspection lane to acquire displacement measurement data along associated measurement axes. At least a portion of the displacement measurement data is associated with the outermost wheel assemblies on an axle of a moving vehicle passing through the inspection region, and utilized to determine one or more vehicle characteristics, such as an axle total toe condition.

11 Claims, 3 Drawing Sheets

(56) References Cited

U.S. PATENT DOCUMENTS

| | | | |
|---|---|---|---|
| 5,532,816 | A | 7/1996 | Spann et al. |
| 5,600,435 | A | 2/1997 | Bartko et al. |
| 5,731,870 | A | 3/1998 | Bartko et al. |
| 5,793,492 | A | 8/1998 | Vanaki |
| 5,812,256 | A | 9/1998 | Chapin et al. |
| 5,818,574 | A | 10/1998 | Jones et al. |
| 5,978,077 | A | 11/1999 | Koerner et al. |
| 6,151,562 | A | 11/2000 | Merrill |
| 6,412,183 | B1 | 7/2002 | Uno |
| 6,545,750 | B2 | 4/2003 | Roth et al. |
| 6,559,936 | B1 | 5/2003 | Colombo et al. |
| 6,657,711 | B1 | 12/2003 | Kitagawa et al. |
| 6,748,796 | B1 | 6/2004 | Van Den Bossche |
| 6,894,771 | B1 | 5/2005 | Dorrance et al. |
| 7,177,740 | B1 | 2/2007 | Guangjun et al. |
| 7,336,350 | B2 | 2/2008 | Dorrance et al. |
| 7,454,841 | B2 | 11/2008 | Burns, Jr. et al. |
| 7,774,946 | B2 | 8/2010 | Boni et al. |
| 7,864,309 | B2 * | 1/2011 | De Sloovere .......... G01B 11/25 356/139.08 |
| 8,107,062 | B2 | 1/2012 | De Sloovere et al. |
| 9,779,560 | B1 * | 10/2017 | Dorrance ............. G07C 5/0808 |
| 9,779,561 | B1 * | 10/2017 | Dorrance ............. G07C 5/0808 |
| 2003/0094039 | A1 | 5/2003 | Poulbot |
| 2003/0142294 | A1 | 7/2003 | Jackson et al. |
| 2006/0090356 | A1 | 5/2006 | Stieff |
| 2006/0152711 | A1 | 7/2006 | Dale, Jr. et al. |
| 2007/0044537 | A1 | 3/2007 | Knox |
| 2007/0124949 | A1 | 6/2007 | Burns, Jr. et al. |
| 2008/0148581 | A1 * | 6/2008 | Boni ................. G01B 11/2755 33/288 |
| 2010/0180676 | A1 | 7/2010 | Braghiroli et al. |
| 2013/0158777 | A1 | 6/2013 | Brauer et al. |
| 2014/0129076 | A1 | 5/2014 | Mouchet et al. |
| 2014/0253908 | A1 * | 9/2014 | Lee .................... G01B 11/2755 356/139.09 |
| 2014/0310967 | A1 | 10/2014 | Nagornov |
| 2015/0059458 | A1 | 3/2015 | Lee |
| 2015/0219785 | A1 | 8/2015 | Tudor et al. |

FOREIGN PATENT DOCUMENTS

| | | |
|---|---|---|
| JP | 5371299 B2 | 12/2013 |
| WO | 2014134719 A1 | 9/2014 |
| WO | 2014151666 A1 | 9/2014 |

OTHER PUBLICATIONS

CCD Laser Displacement Sensor General Catalog LK-G Series, pp. 1-22, 2006, Keyence Corporation, Product Lit. No. LKG-KA-C3-E 0076-1, Japan.

CCD Laser Displacement Sensor General Catalog LK-G Series, pp. 1-22, 2006, Keyence Corporation, Product Lit. No. LKG-WW-C3-E 0096-1, Japan.

K. De Sloovere, W. Pastorius, PH.D, Wheel Alignment Goes 3-D, pp. 1-5, Nov. 5, 2010, Quality Digest Magazine, www.qualitydigest.com.

X-3Dprofile—Dürr Reinvents Wheel Geometry Measurement, pp. 1-2, 2007, Dürr Assembly Products, www.durr.com.

OPTIMA Laser Distance Sensor, pp. 1-2, Mar. 2004, BS2 Multidata GmbH, www.bs-multidata.com.

SIDIS 3D-CAM Wheel Alignment Benches With Innovative Measuring System, pp. 1-8, 2010, Siemens AG, Germany.

Banalogic, Fastlign—The Gold Standard in Vehicle Alignment and Tracking Verification, Banalogic Corp. product literature, pp. 1-4, Oct. 2013, Raleigh, USA.

Expert Solutions—Automotive Industry, pp. 1-4, 2009, Keyence Corporation, Product Lit. No. MeasureExpertAuto-KA-EN0630-E 1034-4, Japan.

* cited by examiner

METHOD AND APPARATUS FOR EVALUATING AN AXLE CONDITION ON A MOVING VEHICLE

CROSS-REFERENCE TO RELATED APPLICATIONS

The present application is related to, and claims priority from, U.S. Provisional Patent Application Ser. No. 62/068,329 filed on Oct. 24, 2014, which is herein incorporated by reference.

STATEMENT REGARDING FEDERALLY SPONSORED RESEARCH

Not Applicable.

BACKGROUND OF THE INVENTION

The present application is related to vehicle measurement or inspection systems, and in particular, to a vehicle inspection or measurement system configured to utilize one or more displacement sensors to acquire measurement data associated with various components of a vehicle axle as the vehicle moves past a stationary measuring station.

Systems for measuring vehicle properties, such as wheel alignment and associated parameters, are traditionally set up for obtaining measurements to a high degree of accuracy under controlled conditions, such as with the vehicle disposed in a stationary location on a level surface or alignment lift rack. These systems may require the temporary placement of various inclinometers or optical targets on the vehicle wheels, from which data is acquired to determine the various measurements. In general, vehicle wheel alignment measurement procedures require a technician to spend time preparing the vehicle for measurements, acquiring the measurements, and performing adjustments necessary to correct any identified problems. Often, a vehicle brought in to a shop for other services may unknowingly be in need of an alignment service as well. However, unless the service technician and the vehicle owner are willing to spend the time required to prepare the vehicle for measurement and proceed with an alignment measurement process, alignment issues will likely remain undetected and unrepaired.

In response to the recognized need for a way to quickly identify vehicles which may require an alignment service, various quick check or inspection systems have been introduced to the market, such as the Quick Check® System from Hunter Engineering Co. of St. Louis, Mo. These systems provide an operator with the tools and procedures necessary to quickly (in less than three minutes) obtain basic measurements of important vehicle wheel alignment angles, enter vehicle identifying information (such as through a VIN barcode scan), and review vehicle diagnostic information such as battery condition, tire tread depth, and on-board diagnostic messages. If a vehicle quick check or inspection reveals a potential out-of-specification measurement or problem, it can be quickly brought to the attention of the vehicle owner, who may then elect to proceed with a more in-depth vehicle service procedure, such as a full vehicle alignment service.

Often, vehicle quick check or inspection systems require a technician to carry out various tasks during the process, including attachment of optical targets or angle sensors to the wheels of the vehicle, manual measurement of tire tread depths, and the coupling of scanner component to vehicle data ports. In order for the technician to complete these tasks, the vehicle must be stationary for part of the time, such as for the attachment (and subsequent removal) of optical targets or angle sensors. This necessitates establishing a routine or procedure which must be followed by a technician each time a vehicle is brought into the shop for service. During busy times, or when multiple customers are waiting, a technician may not have sufficient time to carry out these routines or procedures for every vehicle, potentially failing to identify vehicles in need of additional services.

Vehicle wheel alignment systems have utilized a variety of techniques for non-contact measurement of vehicle wheel assembly parameters, from which vehicle alignment angles can be determined. For example, by utilizing multiple displacement measurement sensors, displacement measurements between known sensor locations and multiple locations on a stationary vehicle wheel assembly can be measured. Processing the acquired measurements from sensors observing stationary wheels on opposite sides of an axle can identify planes parallel to the wheel assembly surfaces, from which representations of total toe of an axle can be determined. In other configurations, two-dimensional images of a vehicle wheel assembly can be acquired, and image processing algorithms utilized to identify geometric features such as the wheel rim edge, from which a perspective analysis can be performed to determine estimates of the vehicle wheel assembly spatial position and orientation. Alternatively, structured light patterns, such as multiple laser lines, or colored stripes, can be projected onto the wheel assembly surface and observed by an imaging system. Deviations in the projected pattern are analyzed to generate representations of the illuminated surfaces, from which vehicle wheel assembly spatial position and orientation can be estimated. In general, these systems require the vehicle wheel assembly to remain stationary relative to the sensors during the measurement acquisition procedure, but some non-contact measurement systems require either the vehicle wheel assembly or the sensors be rotated about a stationary axis of rotation during the measurement acquisition procedure.

Some systems can acquire measurements as a vehicle wheel assembly is both rotated and translated past the sensors, such as during vehicle travel. For example, using laser displacement sensors to measure a distance between a fixed sensor and various points on vehicle wheel assemblies on opposite sides of a vehicle as the vehicle is driven at a slow speed between the sensors, enables a system to acquire measurement data along horizontal slices across each of the wheel assemblies, from which approximations of the individual wheel assembly spatial orientations can be derived. These types of systems are highly influenced by the speed at which the vehicle travels between the sensors, the angle (straightness) of vehicle travel relative to the sensor observation axis, and changes in steering of the vehicle as it passes between sensors. Measurements acquired from a moving vehicle are useful to provide a vehicle service quick check or audit inspection, capable of identifying vehicles which may be in need of a further, more precise, alignment inspection and/or adjustment.

Accordingly, there would be a benefit to the vehicle service quick check or inspection industry if an increased number of preliminary vehicle measurements could be acquired as the vehicle is driven, such as by a customer, through a field of view associated with a non-contact measurement station, preferably without the need to stop before or after passing the measurement station, to have a technician install or remove wheel-mounted optical targets or angle sensors.

There would be an additional benefit to the vehicle service quick check or inspection industry if the sensitivity of a non-contact measurement station to variations in vehicle speed, steering, and direction of travel could be accounted for or attenuated.

BRIEF SUMMARY OF THE INVENTION

Briefly stated, the present application sets forth a vehicle measurement station which utilizes one or more laser displacement sensors disposed on opposite sides of a sensor region to acquire measurement data, associated with a moving vehicle passing through the sensor region, by measuring distances between each sensor and an associated laser spot projected onto an observed surface of the vehicle.

In one embodiment, the present application sets forth a vehicle measurement station which utilizes at least one pair of non-contact imaging sensors disposed on opposite sides of a sensor region to acquire measurement data associated with a moving vehicle passing through the sensor region, and in particular, to acquire measurement data associated with vehicle wheel assemblies on opposite sides of an axle. Data acquired by each imaging sensors is processed to acquire two or more measures of distances between each sensor and an associated point of laser illumination projected onto a surface of an adjacent vehicle wheel assembly passing through an associated imaging sensor observable field of view. A processor is configured to evaluate the measurement data associated with wheel assemblies on each axle, together with the known parameters of the system, to determine an orientation measurement associated with each axle of the vehicle passing between the opposed non-contact imaging sensors.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
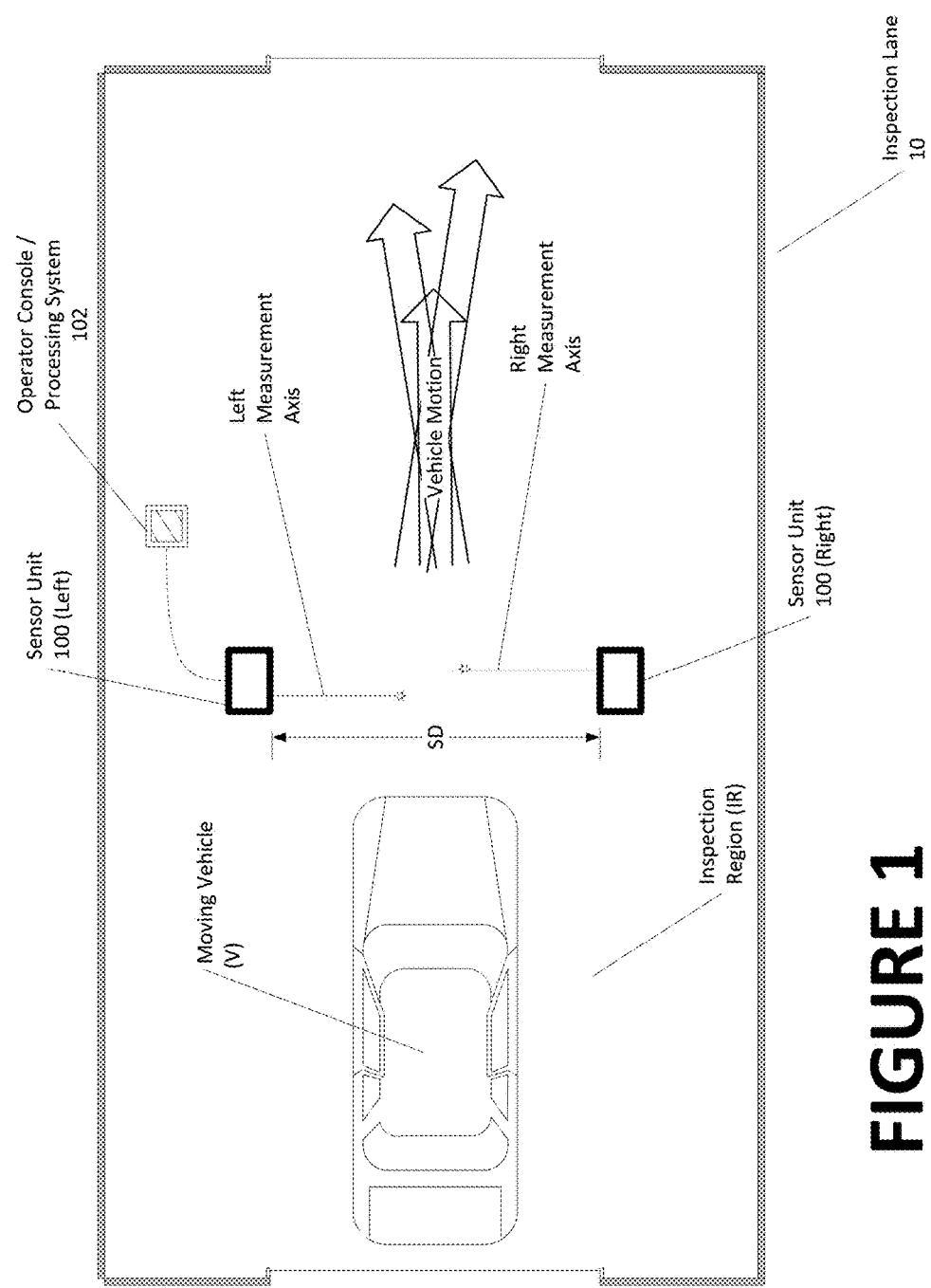
FIG. 1 is a top plan view of a simplified drive-through vehicle inspection lane, illustrating an exemplary configuration and placement locations for sensor units of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The term "axle", as used herein, is intended to refer to a pair of vehicle wheel assemblies disposed on opposite lateral sides of the vehicle which are generally axially aligned with each other, such as the front wheels or rear wheels. The pair of vehicle wheel assemblies may be, but are not limited to wheel assemblies coupled by a solid interconnecting axle shaft, by a pair of half-shafts coupled through a differential, may be partially independent of each other, or may be fully independent of each other.

Since the present application describes features which are present on opposite lateral sides of a vehicle inspection lane, but which are otherwise identical, it will be understood that the use of the reference designations Left and Right, or L and R as in the Figures, identify corresponding components utilized at locations relative the left and right lateral sides of a vehicle. For example, a sensor unit described generically as (100) will be designated as (100R) and (100L) when shown or described at either the right or left side of the vehicle inspection lane.

A vehicle measurement system of the present disclosure is generally intended for use in a vehicle service shop drive-through configuration, where a moving vehicle V is driven in a generally straight line (but not necessarily along, or parallel to, a longitudinal midline) through an inspection region IR of a service or inspection lane 10 as seen in FIG. 1. As the vehicle V passes through the inspection region IR, the vehicle V is observed by various sensors 100 acquiring measurement data. Data from the various sensors 100 is conveyed to a processing system 102 configured with suitable software instructions to control the various sensors, receive data therefrom, analyze the received data, receive operator input, and convey results to an operator output or report. The output or report may be a display on an operator console, a printed report, storage in a machine-readable database, or communication over a network to a remote vehicle service system or software application. The processing system 102 may be in the form of a dedicated computer system and operator interface associated with a specific set of sensors 100 forming a vehicle measurement system, or may be in the form of a server system configured to handle multiple sets of sensors forming two or more vehicle measurement systems. Communications between the various sensors 100 and the processing system 102 may be via any conventional data transmission means, such as wired networks, wireless networks, or any combination thereof.

It will be understood that while portions of this application describe a single sensor unit 100 within a vehicle measurement system having a field of view to sequentially observe at least the front and rear wheel assemblies 104 on one lateral side of a moving vehicle V traversing the sensor field of view, a second identical sensor unit 100 can be disposed with a field of view to sequentially observe the front and rear wheel assemblies 104 on the opposite lateral side of the moving vehicle V, and the resulting data from both sensor units 100R, 100L is received, evaluated, and presented to an operator in a meaningful manner in an output or report, such as at the console 102.

In an exemplary configuration for measuring or evaluating a characteristic associated with an axle of the moving vehicle V, opposite lateral sides of an inspection lane are each provided with at least one sensor unit 100 consisting of a support framework positioned and configured as necessary to mount one or more displacement sensors. Each sensor unit 100 defines an operative field of view along a measurement axis M which will encompass observable surfaces of each passing vehicle wheel assembly 104 on an associated lateral side of the moving vehicle V for a range of measurable vehicles which traverses the observation region. It will be readily recognized that sensor units 100 have an operational range within which the individual displacement sensors contained therein are capable of measuring a distance to an observed surface within a desired tolerance, and that given the wide variation in vehicle configurations, each sensor unit 100 must be disposed such that the observed surfaces on an intended collection of vehicle configurations will pass through the associated observation region. Generally, this will necessitate that at least one sensor unit 100 be disposed on each lateral side of a drive-through inspection lane 10, oriented to acquire measurements from undistorted portions of vehicle wheel assemblies 104 on the moving vehicles V.

The sensor unit 100 may be in the form of a vertical tower positioned on a floor surface in proximity to the drive-through inspection region IR, a wall-mounted housing, a surface or flush-mount configuration, or a combination thereof suitable for mounting one or more individual displacement sensors. Preferably, but not required, the sensor units 100 on opposite sides of the vehicle service bay are located in approximate alignment with each other, such that each sensor unit 100 observes substantially corresponding, but laterally opposite, portions of a moving vehicle V surface and/or wheel assembly 104 at generally the same time.

Within the sensor unit 100, any of a variety of displacement sensors having sufficient measurement resolution to achieve required tolerances may be utilized within the scope of the present disclosure to obtain distance measurements from a moving vehicle V passing through an inspection lane 10, including, but not limited to, 2D imaging sensors, time-of-flight optical sensors, ultrasonic sensors, and laser displacement sensors.

In one embodiment of the present disclosure, each sensor unit 100 includes a 2D imaging displacement sensor, consisting of at least one laser beam projector disposed to project a laser beam along a measurement axis M onto the surfaces for which a displacement measurement is required. Laser light reflected from the surface passes through a receiver system in the sensor unit 100, and is focused onto a two-dimensional light sensing pixel array such as a CCD or CMOS device. The light sensing array detects the peak values of the light quantity, the locations of, and the distributions of, the reflected laser beam spot(s). The distribution of an individual laser beam spot on the pixel array corresponds at least partially with the characteristics of the surface from which the laser beam is reflected. The location of the pixels (individual light sensing elements) on the array within the area impinged by the reflected beam spot(s) are used to determine the associated target point position or displacement relative to the light sensing pixel array. As the displacement of the target surface changes relative to the light sensing pixel array of the sensor, the reflected beam positions change on the light sensing array. The sensitivity of the sensor unit 100 to changes in the target displacement (i.e. movement) varies according to rate at which data is sampled from the light sensing pixel array. Preferably, the data sample rate is sufficient to enable measurements to be acquired from a vehicle V moving at speeds typically found in an automotive service shop drive-through inspection lane 10, i.e., less than 10 miles per hour.

These positional changes of the reflected beam(s) on the light sensing pixel array are analyzed by an associated controller or processor to provide associated displacement measurement values. The distribution of the reflected laser beam spot(s), and any observed changes may optionally be analyzed by the associated controller or processor to identify characteristics of the reflecting surface, such as material type, reflectivity, or transparency. Those of ordinary skill in the art will recognize that within a sensor unit 100, more than two semiconductor laser beam projectors may be utilized to project a plurality of parallel laser beams (for example, defining a grid of illuminated points on the surface of an observed object) which are subsequently reflected to the two-dimensional light sensing pixel array, providing additional information about the observed surface.

Figure 2:
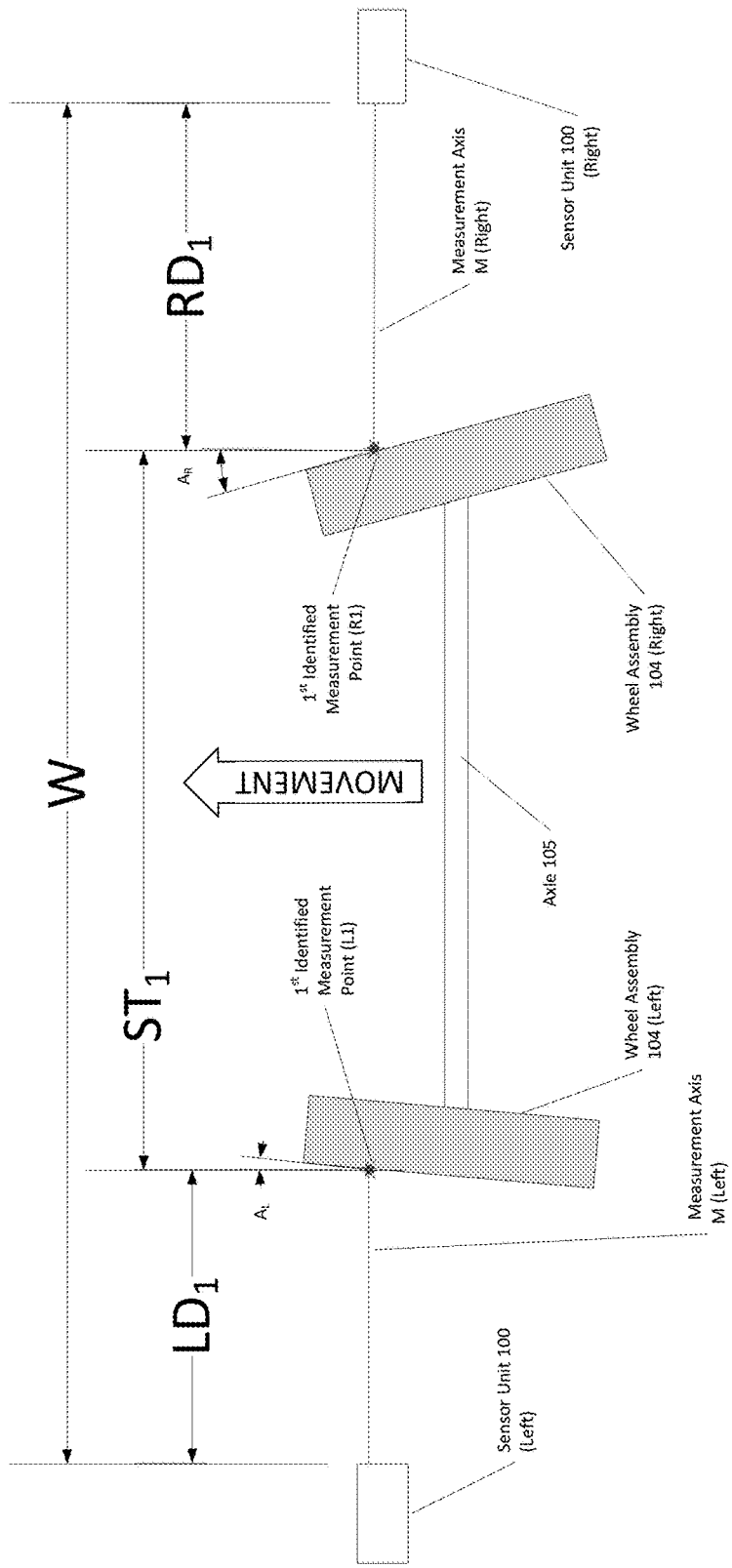
FIG. 2 is a top plan view of the relationships between a pair of opposed displacement sensors and the wheel assemblies on an axle of a moving vehicle associated with measurements of points on the leading tire sidewall surfaces.
Figure 3:
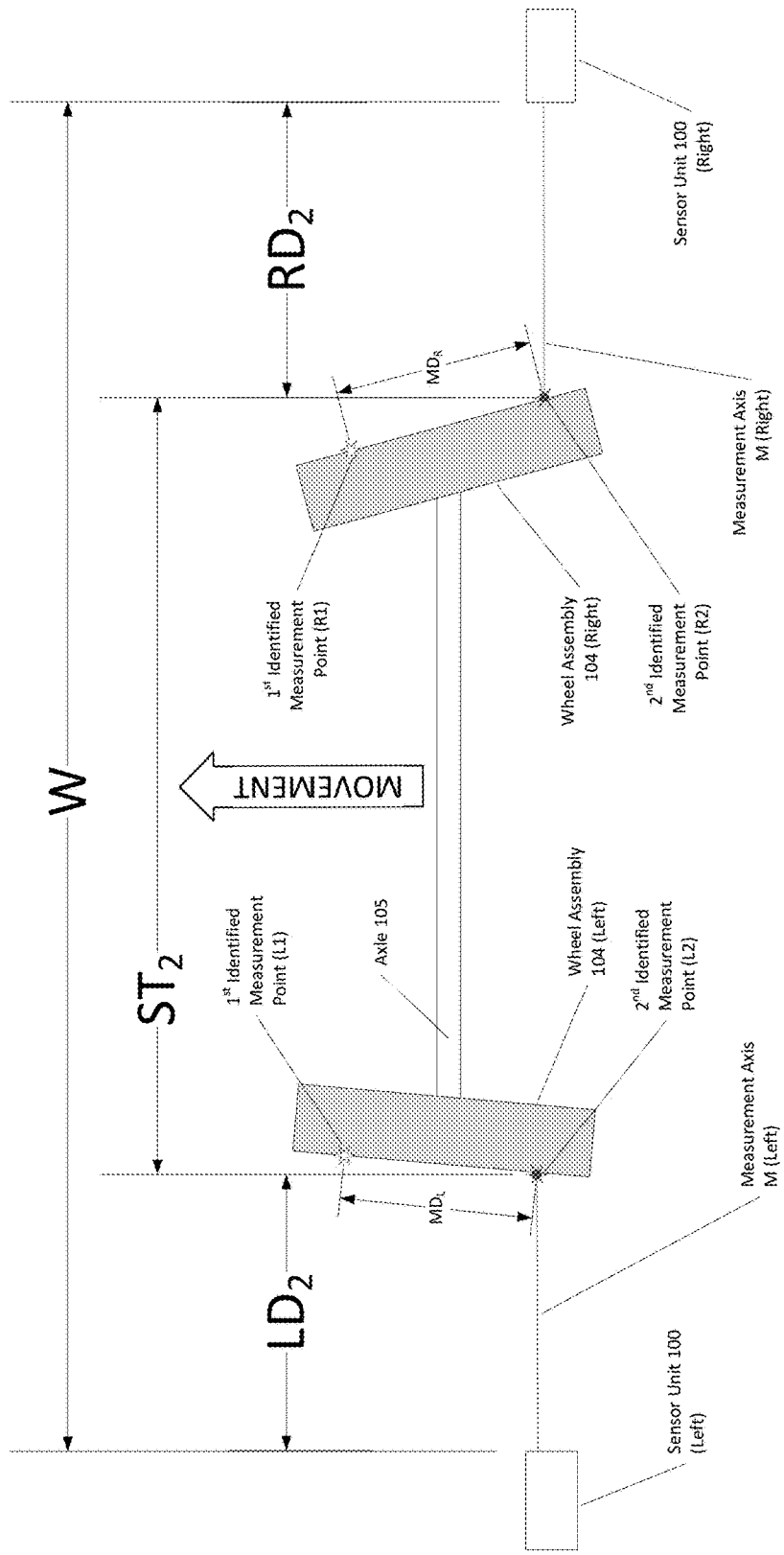
FIG. 3 is a top plan view of the relationships between the pair of opposed displacement sensors and the wheel assemblies on an axle of the moving vehicle shown in FIG. 2, associated with measurements on the trailing tire sidewall surfaces.

In general, in one embodiment of the present disclosure, a sensor unit 100 is utilized to measure distances between the receiver mounted within the sensor unit 100 and each of the front and rear wheel assemblies 104 on one side (left or right) of a moving vehicle V passing through the inspection region IR of the inspection lane 10 as shown in FIG. 1. As the vehicle passes through the sensor region of the inspection lane, each laser spot L projected from the sensor unit 100 traverses horizontally across the side of the vehicle presented towards the sensor unit, at a height which intersects at least a portion of each of the front and rear vehicle wheel assemblies 104, as seen in FIGS. 2 and 3, producing a plurality of data points from which a contour plot of the vehicle surfaces can be established. Various fitting algorithms, such as curve fitting techniques can be utilized to smooth or match the contour plot to identify vehicle features.

For a vehicle which is moving in a straight line, with each wheel assembly 104 aligned parallel to the direction of travel (i.e., having zero toe angle), a projected laser spot L will intersect an identified circumferential feature of the wheel assembly 104 (such as the tire sidewall surface edge, rim guard feature, peak tire sidewall bulge, or wheel rim edge, at two points, each having the same measured displacement from the sensor ($D_1=D_2$). Vehicle wheels which are not aligned parallel to the straight-line direction of travel for the vehicle (i.e., having non-zero toe angle) will produce different measured displacements ($D_1 \neq D_2$) from the sensor unit 100 for the two points at which the measurement axis M intersects the selected circumferential feature as the vehicle moves past the sensor unit 100.

Turing to FIGS. 1 and 2, measurements acquired by an embodiment of the present disclosure for determining data representative of the total toe associated with an axle of a moving vehicle are shown. As the vehicle V moves through the inspection region IR between a pair of sensor units 100L, 100R each having one or more displacement sensors disposed at a common vertical height and having a spacing distance or width W, a pair of measurements $LD_1$ and $RD_1$ are determined which are each representative of a distance from a sensor unit 100 to an identified point L1, R1 on a wheel assembly 104 on the corresponding left or right lateral side of the passing vehicle axle 105. Those of ordinary skill in the art will recognize that a collection of measurements may be acquired sequentially from each displacement sensor 106, and subsequently analyzed, to identify the specific displacement measurements RD, LD corresponding to the identified point L1, R1 on a circumferential feature on each of the left or right wheel assembly surfaces, for example, a peak point on the leading tire sidewall surface bulge, a leading edge of the wheel rim, etc. By subtracting $LD_1$ and $RD_1$ from the spacing distance or width W, a total separation $ST_1$ for the first identified points L1, R1 on the wheel assemblies 104 is obtained.

$$ST_1 = W - LD_1 - RD_1 \qquad \text{(Eqn. 1)}$$

The process is repeated as shown in FIG. 3 to determine a pair of measurements $LD_2$ and $RD_2$ which are each representative of a distance from the displacement sensors 106 to a second identified point L2, R2 on the wheel assembly 104 on the corresponding left or right lateral side of the passing vehicle axle 105. Preferably, these second identified points L2, R2 are each spaced at respective known or determinable lateral distances $MD_L$ and $MD_R$ from the first identified points L1, R1 on each wheel assembly 104. By subtracting $LD_2$ and $RD_2$ from the spacing distance or width W, a total separation $ST_2$ for the second identified points L2, R2 on the wheel assemblies 104 is obtained.

$$ST_2 = W - LD_2 - RD_2 \qquad \text{(Eqn. 2)}$$

A change in the total separation for the wheel assemblies 104L and 104R on the observed axle 105 between the first and second identified points is representative of the total toe for the observed axle, without determining individual toe values for each wheel assembly.

$$\text{Total Toe} \sim ST_1 - ST_2 = \Delta ST \qquad \text{(Eqn. 3)}$$

In an alternate procedure, the total toe value for an observed axle 105 is computed directly from the set of wheel assembly displacement measurements RD, LD associated with the wheels on an axle 105 of a vehicle without reference to the specific sensor spacing distance or width W, the wheel assembly separation distances $ST_1$ and $ST_2$, or the individual toe values for each wheel assembly.

$$\text{Total Toe} \cong LD_2 + RD_2 - LD_1 - RD_1 \qquad \text{(Eqn. 4)}$$

The total toe value can alternatively be expressed in angular form by assuming that the lateral distances $MD_L$ and $MD_R$ between the acquired measurements on the face of each wheel assembly 104L, 104R are approximately equal for each wheel assembly on the observed axle 105.

$$\text{Total Toe} \cong 2 \cdot \arcsin\left(\frac{-\Delta ST}{MD_L + MD_R}\right) \qquad \text{(Eqn. 5)}$$

Slight differences between $MD_L$ and $MD_R$ resulting from sensor timing, sensor placement, or minor vehicle steering movement can be ignored for purposes of obtaining a Quick Check® type total toe measurement for an axle 105.

Total toe values determined using the methods of the present disclosure may be presented to the operator of a vehicle inspection system via any suitable output or report. The output or report may be a display on an operator console, a printed report, storage in a machine-readable database, or communication over a network to a remote vehicle service system or software application. As an alternative to presenting the operator with specific numerical representations of total toe, the inspection system may be configured to compare a determination of total toe for each vehicle axle against an acceptable total toe value, and to provide as output either a pass or fail indication for each axle, a pass or fail indication for the vehicle as a whole, or a representation which is indicative of the relationship between the determined total toe value and the acceptable total toe value for each measured axle or the vehicle.

While the various embodiments of the present disclosure have been presented in the form of stationary sensor units containing one or more stationary displacement sensors or imaging sensors disposed to view a vehicle moving through a sensor region of an inspection lane, those of ordinary skill in the art will recognize that the element of movement between the sensor units and the vehicle may alternatively be achieved by maintaining the vehicle in a stationary position within a sensor region, and moving a set of displacement and/or imaging sensors laterally along a known path on each side of the vehicle to acquire the necessary measurement data, without departing from the scope of the present invention.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An axle condition evaluation system, comprising:
 a first sensor unit disposed on a first associated lateral side of a vehicle inspection lane;
 a second sensor unit disposed on a second associated lateral side of said vehicle inspection lane, said second lateral side opposite said first associated lateral side;
 wherein said first sensor unit is configured to acquire a first plurality of distance measurements along more than two measurement axes in a first set of measurement axes to a surface of a first rolling wheel assembly on an end of an axle adjacent to a first associated lateral side of a moving vehicle passing through said inspection lane in a generally straight line, but neither along nor parallel to, a longitudinal midline of the inspection lane;
 wherein said second sensor unit is configured to acquire a second plurality of distance measurements along more than two measurement axes in a second set of measurement axes to a surface of a second rolling wheel assembly on an end of said axle adjacent to a second associated lateral side of said moving vehicle;
 wherein each of said first and second sensor units is operatively coupled to convey said first and second pluralities of distance measurements to a processing system configured with software instructions to determine, from said acquired distance measurements, a total toe of said axle without determining representations of individual toe for said first and second rolling wheel assemblies.

2. The axle condition evaluation system of claim 1 wherein said processing system is operatively coupled to an operator console and configured to display a pass or fail indication for said total toe of said axle.

3. The axle condition evaluation system of claim 2 wherein said processing system is operatively coupled to a communication network and configured to convey said pass or fail indication for said total toe to a remote system.

4. The axle condition evaluation system of claim 1 wherein said processing system is configured with said software instructions to compare said determined total toe with a total toe specification value, and to generate a responsive output of a pass or a fail indication responsive to said comparison.

5. The axle condition evaluation system of claim 1 wherein said first and second sensor units are each configured with an associated displacement sensor to acquire said plurality of distance measurements, each displacement sensor consisting of at least three laser projectors aligned to project a set of laser beams, and an associated light sensing pixel array oriented to receive laser light from said set of laser beams reflected from the vehicle.

6. A method for assessing a condition of an axle of a moving vehicle, said axle having a left outermost wheel on a left side of a centerline of the vehicle, and a right outermost wheel on a right side of the centerline, opposite from said left side, comprising:
  for the right outermost wheel assembly on an axle, contactlessly determining while the vehicle is moving, a first distance ($RD_1$) along each of a plurality of right side fixed measurement axes between associated right side fixed points not on the vehicle and associated first right side locations on a feature of the right outermost wheel assembly outer surface;
  for said right outermost wheel assembly on said axle, contactlessly determining while the vehicle is moving, a second distance ($RD_2$) along each of said plurality of right side fixed measurement axes between said associated right side fixed points and associated second right side locations on the feature of the right outermost wheel assembly outer surface;
  for the left outermost wheel assembly on an axle, contactlessly determining, while the vehicle is moving, a first distance ($LD_1$) along each of a plurality of left side fixed measurement axes between associated left side fixed points not on the vehicle and associated first left side locations on a feature of the left outermost wheel assembly outer surface;
  for said left outermost wheel assembly on said axle, contactlessly determining, while the vehicle is moving, a second distance ($LD_2$) along each of said plurality of left side fixed measurement axes between said associated left side fixed points and associated second left side locations on the feature of the left outermost wheel assembly outer surface; and
  for each pair of left and right side fixed measurement axes disposed at a common vertical height, generating an output of a total toe value for said axle from said determined distances ($RD_1$, $RD_2$, $LD_1$, and $LD_2$), without determining an individual toe value for either outermost wheel assembly on said axle.

7. The method of claim 6 for assessing a condition of an axle of a moving vehicle wherein said step of generating an output of said total toe includes, for each of said pairs of left and right side fixed measurement axes disposed at common vertical heights;
  a) evaluating the left side and right side first determined distances ($RD_1$ and $LD_1$), together with a known spacing (W) between said associated left and right side fixed points, to calculate a first separation distance ($ST_1$) between said left and right side first locations on said features of said outermost wheel assemblies;
  b) evaluating the left side and right side second determined distances ($RD_2$ and $LD_2$), together with said known spacing (W), to calculate a second separation distance ($ST_2$) between said left and right side second locations on said features of said outermost wheel assemblies;
  c) comparing the first separation distance ($ST_1$) and the second separation distance ($ST_2$) to determine a separation distance change; and
  evaluating said separation distance change associated with each pair of fixed measurement axes to determine said total toe for said axle.

8. The method of claim 7 wherein said step of evaluating said separation distance change includes calculating an angular representation of said total toe for said axle according to:

$$\text{Total Toe} \cong 2 \cdot \arcsin\left(\frac{-\Delta ST}{MD_L + MD_R}\right)$$

where $\Delta ST$ is said separation distance change;
  where $MD_L$ is a lateral separation between said first and second locations on said left outermost wheel assembly on said axle; and
  where $MD_R$ is a lateral separation between said first and second locations on said right outermost wheel assembly on said axle.

9. The method of claim 6 for assessing a condition of an axle of a moving vehicle wherein said step of generating an output of said total toe for each pair of left and right side fixed measurement axes disposed at a common vertical height includes calculating a total toe value by subtracting each of the determined distances ($LD_1$, $RD_1$) to the respective first locations from a sum of the determined distances ($LD_2$, $RD_2$) to the respective second locations; and
  converting said calculated total toe value into an angular representation of said total toe for said axle.

10. A system for assessing an axle total toe of a moving vehicle, the system comprising:
  a left side stationary apparatus and a right side stationary apparatus between which said vehicle passes while moving in a direction of travel;
  said left side stationary apparatus configured to generate for each of a plurality of left side measurement axes, a first output signal indicative of an associated distance ($LD_1$) to an associated first point on the outer surface of a left-side outermost wheel assembly on an axle of said moving vehicle, and subsequently, for each of said plurality of left side measurement axes, a second output signal indicative of an associated distance ($LD_2$) to an associated second point on the outer surface of said left-side outermost wheel assembly;
  said right side stationary apparatus configured to generate for each of a plurality of right side measurement axes a first output signal indicative of an associated distance ($RD_1$) to an associated first point on the outer surface of a right-side outermost wheel assembly on said axle, and subsequently, for each of said plurality of right side measurement axes, a second output signal indicative of an associated distance ($RD_2$) to an associated second point on the outer surface of said right-side outermost wheel assemblies; and a control system configured to receive the output signals from the left and right side stationary apparatus and to determine from said received output signals, a total toe for said axle based on said distances ($LD_1$, $RD_1$) to said pair of first points and said distances ($LD_2$, $RD_2$) to said pair of second points associated with said measurement axes.

11. The system of claim 10 wherein said control system is further configured to identify a pass or fail indication associated with said axle total toe, said fail indication indicating a determined value for said axle total toe exceeds an associated specification tolerance.

\* \* \* \* \*